United States Patent [19]

Miller, deceased

[11] 4,219,524
[45] Aug. 26, 1980

[54] METHOD AND APPARATUS FOR PRODUCING SHEET MOLDING COMPOUND

[75] Inventor: Everett R. Miller, deceased, late of Granville, Ohio, by Vesta V. Miller, administrator

[73] Assignee: Owens-Corning Fiberglas Corporation, Toledo, Ohio

[21] Appl. No.: 2,270

[22] Filed: Jan. 10, 1979

Related U.S. Application Data

[63] Continuation of Ser. No. 907,376, May 18, 1978, abandoned, which is a continuation-in-part of Ser. No. 773,242, Mar. 1, 1977, abandoned.

[51] Int. Cl.² .................... B29C 15/00; B29D 3/02; B29D 7/14
[52] U.S. Cl. .................................... 264/216; 264/313
[58] Field of Search .................... 264/108, 212, 216; 425/372; 100/118, 153

[56] References Cited

U.S. PATENT DOCUMENTS

| 2,989,775 | 6/1961 | Pekarek | 425/372 |
| 3,222,439 | 12/1965 | Bolomey et al. | 264/108 |
| 3,568,245 | 3/1971 | Jetzer | 425/372 |
| 3,966,856 | 6/1976 | Williams | 264/108 |

FOREIGN PATENT DOCUMENTS 154280 11/1920 United Kingdom ............... 425/372

Primary Examiner—W. E. Hoag
Attorney, Agent, or Firm—Ronald C. Hudgens; Philip R. Cloutier; Greg Dziegielewski

[57] ABSTRACT

The invention relates to apparatus and method for forming a sheet molding compound. The sheet molding compound is linearly advanced. A moveable upper surface formed by a belt passing around a series of driven rollers is adapted to contact the upper surface of the sheet molding compound. The belt is held in biased relationship to the sheet molding compound. In one arrangement of the invention, the sheet molding compound is caused to undulate vertically while retained in compression to induce one form of shear effect. In still another embodiment, as the molding compound is passed in vertically undulating fashion between compressing mesh belts, one of the belts is driven at a fixed rate, while the opposite is driven at rates oscillating above and below the fixed rate.

10 Claims, 10 Drawing Figures

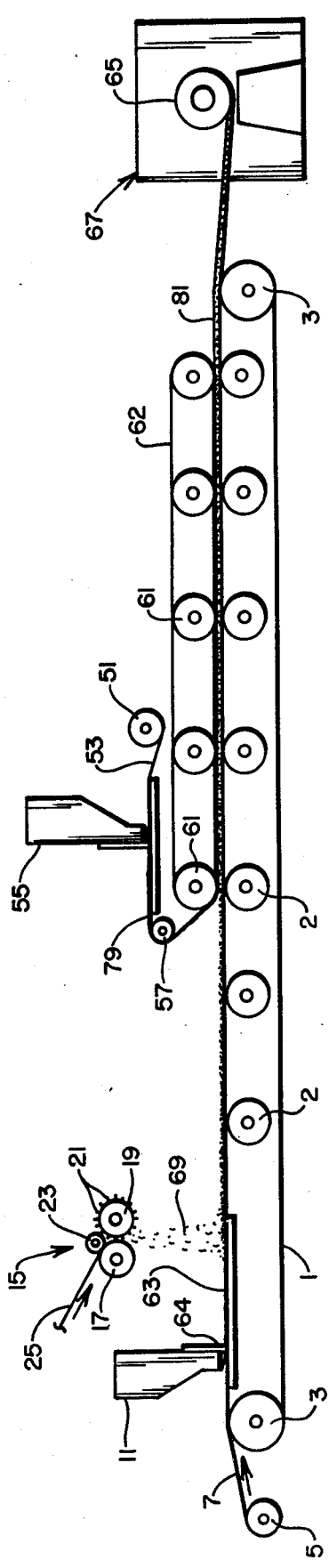
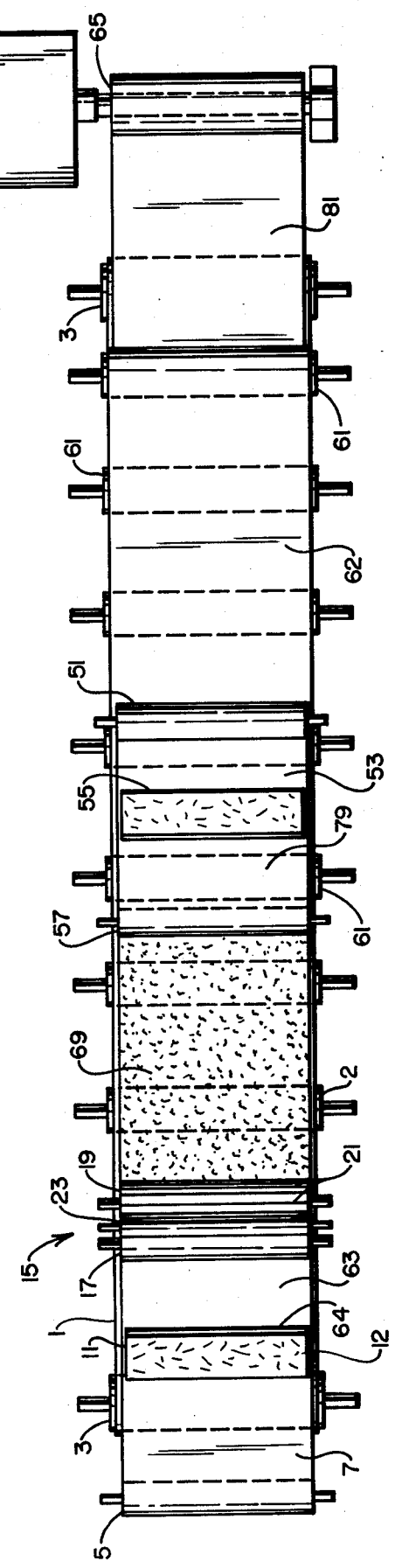
FIG. 1
FIG. 2

METHOD AND APPARATUS FOR PRODUCING SHEET MOLDING COMPOUND

This is a continuation, of application Ser. No. 907,376, filed May 18, 1978, now abandoned which is a continuation-in-part of application Ser. No. 773,242, filed Mar. 1, 1977 now abandoned.

BACKGROUND OF THE INVENTION

This invention relates to a method and apparatus for producing a reinforced molding compound in a sheet form. More particularly the invention relates to an improved compaction section or wet out station to be used in forming the molding compound.

In the past a number of devices have been used to produce molding compounds in sheet form. Usually these devices deposit a reinforcing material and a resinous material molding compound in a pre-molded state between two carrier sheets. Then the composite retained as a layer between the carrier sheets, is passed between two opposed compaction rolls or a series of opposed compaction rolls that are in spaced apart relationship to wet out the reinforcement and resin. However, the prior art compaction rolls only supply force for a short period of time to the composite and the reinforcements are not always completely wet out by the resin. Also when the composite is formed there is frequently air entrapped beneath the carrier sheets. When the composite passes through the compaction rolls the air is not always forced from beneath these carrier sheets. After the composite passes through the compaction rolls the composite springs back and large air bubbles can be formed beneath the carrier sheets. These air bubbles can break the carrier sheets leading to production line shut-down or cause non-uniformities when the composite is molded. In addition the unequal force applied by the compaction rolls, the springing back of the composite after it passes through the compaction rolls and the air bubbles can cause the reinforcement in the composite to be displaced or moved. When the reinforcement is displaced the strength provided by the reinforcement may no longer be uniform as the positioning of the reinforcement in the composite is no longer uniform. Accordingly, the strength of an article molded from the composite may not be as uniform as desired.

A complete wet out of the fibers of the composite is essential to the quality of the ultimately molded product. The difficulties heretofore encountered in achieving proper wet out have resulted in limitations both in continuous process production rates as well as in the restriction of fiber loading or weight and thickness of the sheet molding compounds. When properly wet out, the entire surface of each fiber within the resin matrix is coated with resin. Failure to properly wet out a fiber of fibers generally results in the presence of an internally disposed air pocket or bubble representing a production defect.

In any event the non-uniformities that may be produced by the compaction rolls can reduce the uniformity of the sheet molding composite that is produced. This in turn can effect the uniformity of article molded from the composite. These non-uniformities can also effect the reproducibility or uniformity of composites that are produced at different times.

According to the invention there is provided a method and apparatus defining a means for linearly advancing a sheet molding compound. A moveable upper surface formed by a belt passing around a series of driven rollers is adapted to contact the upper surface of the sheet molding compound. The belt of the upper surface is held in biased relationship to the sheet molding compound.

An object of the invention is to provide an improved method and apparatus for making sheet molding compound.

Another object of the invention is to provide an improved method and apparatus for compacting and effecting wet out of the fibers of the sheet molding compound.

The invention is further addressed to an apparatus and method for treating sheet molding compound present as a composite of a molding compound in a pre-molded state having reinforcing fibers disposed therewithin, the composite being retained as a layer between the mutually inwardly disposed surfaces of two continuous thin, supporting sheets. Both the composite and supporting sheets are moved along a production path through two mutually facing continuous belts which preferably are steel mesh belts under tension. By arranging the roller supports of the belts appropriately, the composite and supporting sheets are caused to be not only compressed but to flex in vertically undulating fashion to derive a very high quality of wet out of the fibers within the resin matrix. In one arrangement, one belt is moved or driven at a fixed rate, while the belt adjacent thereto is driven at a rate continually oscillating a predetermined amount above and below the aforesaid fixed rate. Such an arrangement, particularly when combined with the noted undulatory manipulation of the material, serves to considerably improve production rates as well as afford a capability for producing materials of greater thickness and fiber loadings, ultimately deriving higher strengths. In another embodiment of the invention, four continuous belts are utilized in the fashion described, those adjacent belts positioned upstream along the production path being arranged to assert a first wet out action upon the composite and the next succeeding pair of belts asserting another wet out action specific to the altered state of the composite as it passes through the first pair of belts. Additionally, the operator is afforded the opportunity to alter the degree of compression exerted by any given pair of continuous belts. A highly desirable flexibility thus is afforded the operator with the four belt system. By utilizing a steel mesh belt of relatively coarse mesh configuration, larger composite sizes can be treated initially without causing the resin component to migrate away from the fibers or "squeeze out". In effect, the resin is trapped in a myriad of pockets to inhibit such migration at the upstream stage of treatment. The downstream pair of belts then can be provided having a finer mesh configuration to effect the final and thorough wet out of all fibers within the larger composite structure. As a consequence, composite structures exhibiting considerably enhanced strength and size can be produced where such production was heretofore impossible at practical and economical production rates.

DESCRIPTION OF THE DRAWINGS

FIG. 1 is a side elevation view of the apparatus for producing sheet molding compound.

FIG. 2 is a top view of the apparatus for producing sheet molding compound.

DESCRIPTION OF THE PREFERRED EMBODIMENTS

Figure 3:
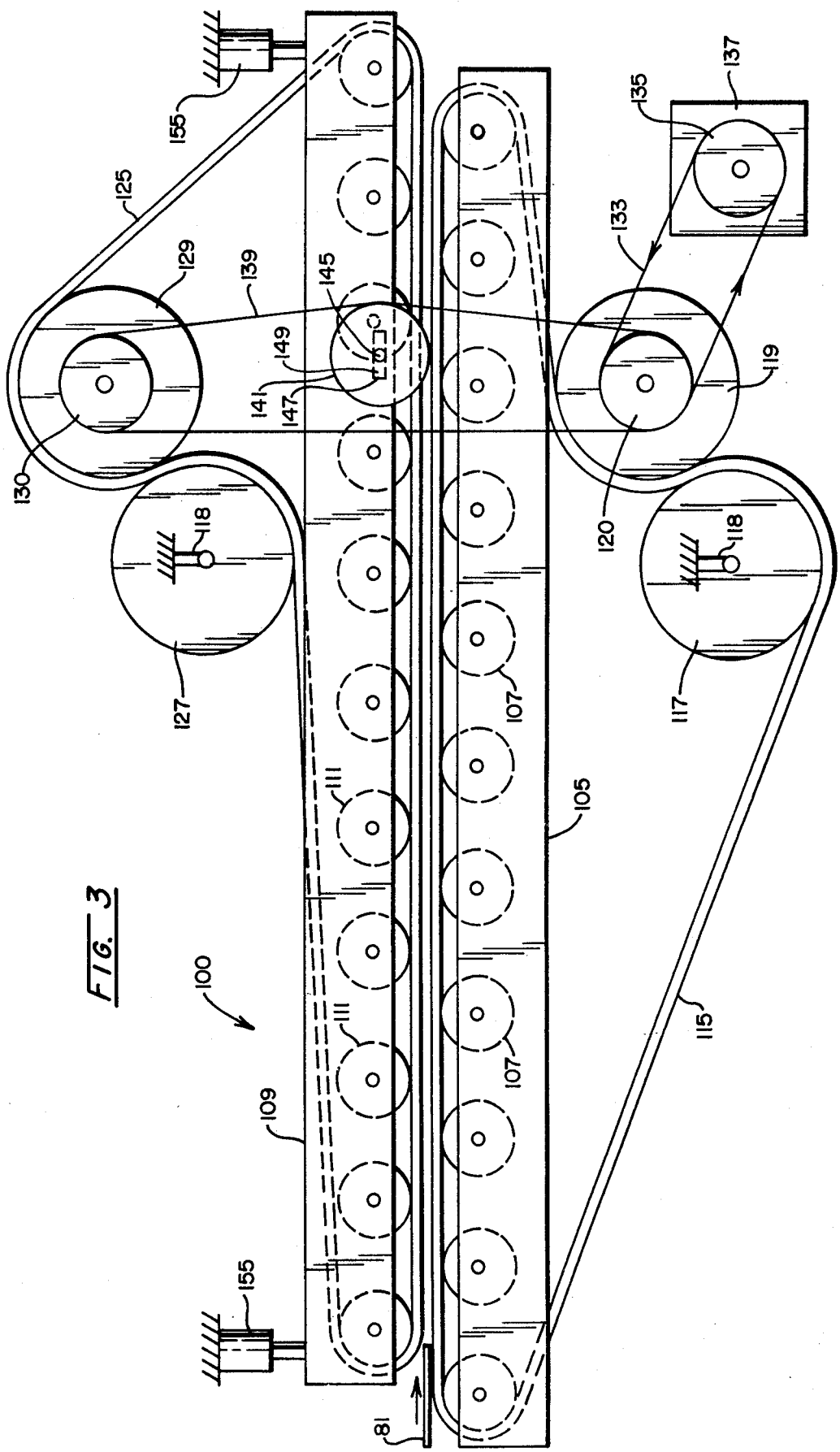
FIG. 3 is a side elevation view of the compaction section or wet out stage used to produce the sheet molding compound.

The invention will be more fully explained in the following descriptive material with reference made to the attached drawings. FIGS. 1 and 2 show apparatus for producing a reinforced resinous molding compound in sheet form. The apparatus has a movable conveyor 1 that is supported on a series of rollers 2. At each end on the conveyor there is a large drive roll 3 for supplying movement to the conveyor. Any conventional drive means can be used to drive or rotate the drive rolls 3 to advance the conveyor. As the conveyor passes around the drive rolls it forms a continuous closed loop around the drive rolls.

At one end of the conveyor a first roll 5 of thin material is located. The sheet material 7 can be unrolled from the roll 5 onto the upper surface of the conveyor. The sheet material will be of a width that it will extend across the entire width of the conveyor. Although a number of materials can be used for the sheet material, it has been found that a thin vinyl material works very satisfactorily.

Located along the conveyor is a reservoir 11 for holding a flowable resinous material 12. The reservoir 11 has four sides that define the container but there is no bottom wall in the reservoir. The reservoir is positioned so that is is spaced apart from the upper surface of the sheet material 7 on the conveyor.

Positioned next along the conveyor is a chopper 15 for chopping reinforcing material 25 to a certain length. The chopper contains a rotatable resilient cot roll 17 and a rotatable chopping roll 19. Positioned around the periphery of the chopping roll is a series of blades 21. The blades 21 strike the cot roll as the chopping roll is rotated. Positioned above the cot roll is an idler roll 23 that is in contact with the cot roll.

The blades 21 on the chopping roll extend across the width of the chopping roll. Also, the blades are spaced apart a distance that is substantially the same as the desired length for the chopped reinforcing material.

A second roll of thin sheet material 51 is located after the chopper along the path of the conveyor. The sheet material 53 from this roll passes beneath a resin reservoir 55, around a rotatable roll 57 and onto the surface of the conveyor. The resin reservoir 55 is substantially the same in construction and is located substantially the same distance above the sheet material as the previously described resin reservoir 11.

A series of freely rotatable compaction rolls 61 are positioned above the conveyor. A belt 62 passes around the compaction rolls in a continuous closed loop. The compaction rolls and belt extend across the entire width of the conveyor. The compaction rolls are positioned so that the belt is in contact with the upper surface of the second sheet of material on the conveyor. The belt should be positioned around the compaction rolls so that the belt is kept in a taut or tensioned condition.

The belt 62 could be constructed of almost any material. However, in practice it has been found that a steel mesh belt works most satisfactorily.

At the end of the conveyor is located a rotatable collet 65 that is supported by framework 67. The collet is located at approximately the same height as the upper surface of the conveyor and the material formed on the conveyor is collected as a wound package on the collet. A motor (not shown) is attached to the collet for rotating the collet at substantially the same speed as the advancing conveyor.

The operation of this invention will be more fully understood by referring to FIGS. 1 and 2 in conjunction with the following description. The conveyor 1 is caused to move by any suitable drive means (not shown). As the conveyor advances a layer of the supporting sheet material 7 is placed on the upper surface of the conveyor so that the sheet material is carried along with the moving conveyor.

As the sheet material advances it passes under a resin reservoir 11 positioned along the path of the conveyor. A layer of resinous material 63 which is a molding compound in an unmolded state, is deposited onto the upper surface of the sheet material by the resin reservoir. The front edge 64 of the resin reservoir acts as a metering blade to control the thickness of the layer of resin that is deposited onto the sheet material.

Next the sheet material is advanced under the reinforcement chopper 15. At the chopper, strands of reinforcing material 25 are fed between the cot roll 17 and the rotating chopping roll 19 and the blades 21 on the chopping roll break the reinforcing material into a plurality of short lengths of reinforcing material 69. The short lengths of reinforcing material are deposited onto the layer of resin 63 on the upper surface of the advancing sheet material.

Positioned next along the advancing conveyor is a second roll of supporting sheet material 51. The sheet material 53 from the roll is passed under a resin reservoir 55 and a layer of resin 79 is deposited onto the upper surface of the sheet material. The resin reservoir works substantially similar to the previously described resin reservoir 11. The resin coated sheet material passes around rotatable roll 57 and advances down to the conveyor. The resin layer 79 on the sheet material comes into contact with the chopped reinforcement and resin that are already being advanced along the conveyor. Thus, the resin and chopped reinforcements are sandwiched between 2 thin sheets of material.

Next the composite 81 of the resin, reinforcing material sandwiched with two sheets of supporting material passes under the belt 62 and compaction rolls 61. As the composite 81 advances it will usually cause the belt 62 to advance around the rotatable compaction rolls. The belt and compaction rolls exert a downward force or a compaction force on the composite. This compaction force pushes the resin and reinforcing material together so that the reinforcing is wet out by the resin. The compaction force also assists in removing entrapped air from the composite. In between the compaction rolls 61 the weight and tautness of the belt 62 continues to exert a compaction force on the composite. Thus, the composite is kept under a compaction force for an extended residence interval, i.e. during the entire time it is under the belt 62. This compaction force is also uniform across the entire width of the belt and serves to exert a shear-type force across the resin-fiber composite simultaneously with the noted compression thereof inasmuch as belt 62 is not directly motor driven.

After passing under the belt 62 the composite advances along the conveyor to a collet 65. The collet 65 is rotated at substantially the same speed as the advancing composite and the composite with supporting thin sheets is wrapped around the collet to form a wound package.

Figure 4:
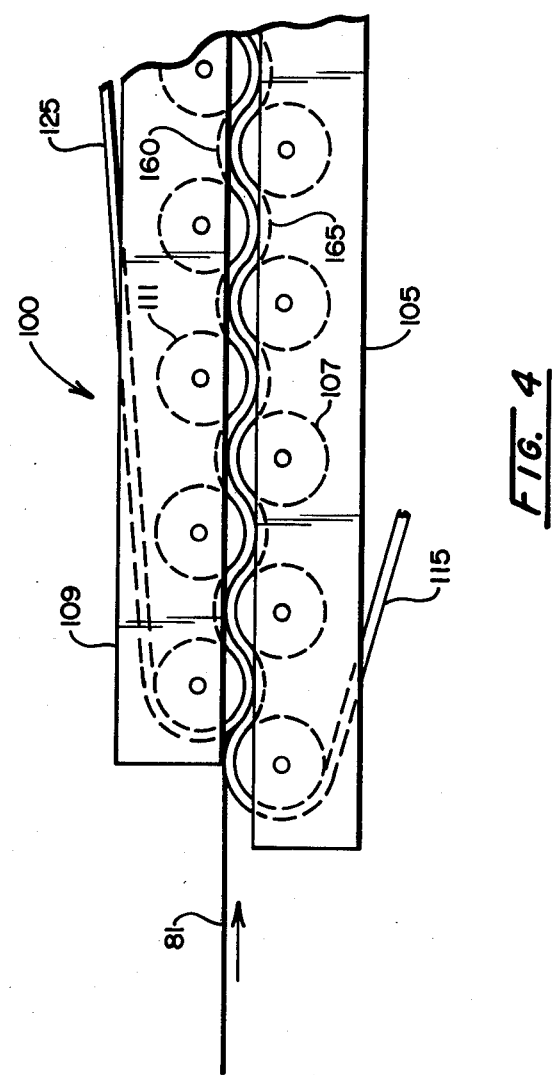
FIG. 4 is a partial side elevation view of the compaction section or wet out stage shown in FIG. 3 where the compaction section is compacting sheet molding compound.

FIGS. 3 and 4 show an additional embodiment of compaction section or wet out stage that can be used to produce a reinforced resinous molding compound. In these figures the composite sandwich 81 is produced as previously described; then the composite is advanced to a separate compaction section or wet out stage 100. The compaction section has a stationary lower member 105 having a series of rotatable rollers 107 mounted therein and a movable upper member 109 having a series of rotatable rollers 111 mounted therein. A movable belt 115 is positioned around the rollers 107, an idler roll 117 and a drive roll 119 to form a continuous closed loop around the lower member. On the upper member a movable belt 125 is positioned around the rollers 111, and idler roll 127 and a drive roll 129 to form a continuous closed loop. The idler roll 117 and idler roll 127 are slidably mounted on lower and upper members respectively. The idler rolls can move in a radial direction with respect to the adjacent drive roll due to the sliding mounting arrangement for the idler rolls.

A biasing means 118 is positioned on idler roll 117 and idler roll 127. The biasing means supplies a constant force to the idler rolls and act to urge the idler rolls in a generally downward direction against the upper and lower belts. The biasing means can be a spring, weight or other suitable means.

A double sprocket 120 is located on the lower drive roll 119 and sprocket 130 is located on the upper drive roll 129. A chain 133 connects the double sprocket 120 to sprocket 135 located on the drive motor 137. Chain 139 connects double sprocket 120 to sprocket 130. Therefore, sprockets 120 and 130 are both connected to the drive motor by chain 133 and chain 139.

A rotatable idler sprocket 141 is positioned on the upper member 109 and is in contact with the chain 139. The axle or support 145 for the idler sprocket is slidably mounted in slot 147 in the upper member. A spring or air cylinder 149 is positioned in the slot and the spring pushes against the axle 145 of the idler sprocket to urge the idler sprocket to move towards the chain. The spring 149 usually urges the idler sprocket to move in a direction that is the same as the direction of advancement of the composite material.

At each end of the upper member 109 there is located an air cylinder 155 serving, in effect, as a compaction actuator, that is used to vertically position the upper member. The air cylinders can be used to either raise or lower the upper member. FIG. 4 shows the position the upper member would normally be in, with respect to the lower member, during actual use of the compaction section. In this figure it can be seen that the rotatable rollers 107 in the lower member and the rotatable rollers 111 in the upper member are positioned so that the arc of the rollers that contacts the composite will fit in the space provided between the adjacent two rollers on the opposite member. Thus, the lower belt 115 and the upper belt 125 define a generally undulating or sinusoidal path when upper and lower members are in the operating position shown in FIG. 4.

In operation the compaction section 100 will be placed in the normal operating position by activating air cylinders 155 to lower the upper member 109 to the general position shown in FIG. 4. This movement of the air cylinders will also provide a downward or compaction force to the upper member. When the upper member is properly positioned, the drive motor 137 is activated and this causes sprocket 135 to rotate. Chain 133 transfers the rotation of sprocket 135 to double sprocket 120 and chain 139, which connects double sprocket 120 and sprocket 130, causes sprocket 130 to rotate. Thus, drive roll 119 and drive roll 129 are caused to rotate, by the rotation of sprocket 120 and sprocket 130 respectively, when the drive motor is activated. It should be noted that sprockets 120 and 130 are substantially the same diameter and that drive roll 119 and drive roll 129 are also substantially the same diameter. Accordingly, the circumferential speed of the drive roll 119 and drive roll 129 will be substantially the same.

As the drive roll 119 rotates it causes the belt 115 to advance around the rollers 107 and idler roll 117. At the same time drive roll 129 is rotating and causing belt 125 to advance around rollers 111 and idler roll 127. Since drive rolls 119 and 129 are rotating at substantially the same speed, belt 115 and belt 125 will also be advanced at substantially the same speed. The two belts will be driven so that they are advanced over the rollers 107 and 111 in the same direction as the composite is being advanced. The speed of drive motor, drive rolls and sprockets should be selected to advance the belts at substantially the same speed as the composite is being advanced.

As the two belts advance, the biasing means 118 on idler roll 117 and idler 127 will force the idler rolls in a generally downward direction against the belts with a constant force. The constant force from the idler rolls will keep a constant tension on the upper and lower belts as the belts are advanced. Also the idler sprocket 141 is urged against chain 139 with a constant force supplied by spring 149. The force from the idler sprocket keeps the chain at the proper tension. Since the idler sprocket can slide in slot 147, the idler sprocket can keep tension on the chain 139 even though the upper member is moving in a vertical direction.

FIG. 4 shows the composite 81 with supporting sheets as it passes through a portion of the compaction section. Once the composite comes into contact with the belts, the advancing belts grip the composite and advance the composite through the compaction section. In the compaction section the composite is forced to follow a generally undulating path that is formed as the belts pass over rollers 107 and rollers 111.

The downward or compaction force supplied to the upper member by the compaction actuators or air cylinders 155 will be transferred to the belts through rollers 107 and rollers 111. The compaction force will act on the composite primarily when the composite is passing between the nip region formed by opposing rollers on opposite members. The compaction force will cause the composite to deform and compact. When the composite is in the peaks 160 and valleys 165 formed between adjacent rollers on a member, the compaction force supplied by the air cylinder and the weight of the compaction section will not be as great. However, the composite must displace the upper and lower belts to move through the compaction section. Since the biasing means 118 on the idler roll 117 and idler roll 127 supplies a constant tension to the belts, the composite must overcome the force of this tension to displace the belts. Thus, the biasing means 118 keeps a level of tension on the belts that also exerts a compaction force on the composite. Accordingly, as the composite moves through the compaction section, the composite will always be under a compaction force.

The compaction force, shear and related phenomena on the composite will push the resinous material and reinforcing material together to wet out the reinforcing material. The undulating path formed by the compaction section or wet out stage causes the composite to be cycled in an up and down or vertical direction and this movement improves the flowing together of the reinforcing material and resinous material and therefore improves the wet out of the reinforcing material. The compaction force also forces entrapped air out of the composite. Since the composite is kept under continual compression in the compaction section large air bubbles do not have a chance to form. Further, the continual force supplied by the compaction section discourages any movement by the reinforcing material in the composite.

The air cylinders used to position the upper member 109 can be operated independently of one another. Therefore, the air cylinder at the entrance and of the compaction section can be exerting a different force on the upper member than the air cylinder at the exit end of the compaction section. Thus, the compaction force supplied by the air cylinders can be different along the length of the compaction section by having the air cylinders supplying different forces at each end of the upper member.

In the previously described embodiments a chopped reinforcing material has been used. In practice it has been found that glass fibers work very well as this reinforcing material. Also the glass fibers could be continuous fibers, the glass fibers could be chopped fibers that have been deposited with the longitudinal axis of the fibers being substantially parallel to one another, or other well known forms of glass fiber reinforcements could be used in the composite.

Almost any resinous material that is normally used to make a molding compound in sheet form could be used in this invention. However, thermosetting resins and particularly polyester resins have been found to work most satisfactorily.

As described hereinabove in connection with the embodiment of FIGS. 3 and 4, the wet out stage 100 combines a continuous compression over the composite 81 in combination with the imposition of a shear effect thereon occasioned from a vertically undulating manipulation. This combination of activities imposed upon the composite achieves such a high degree of wet out that thicker composites and higher fiber loaded products can be produced at advantageously higher production rates. Further improvements are available with the wet out stage embodiment represented in FIGS. 5-8, composite 81 being fabricated as described in FIGS. 1 and 2.

Figure 5:
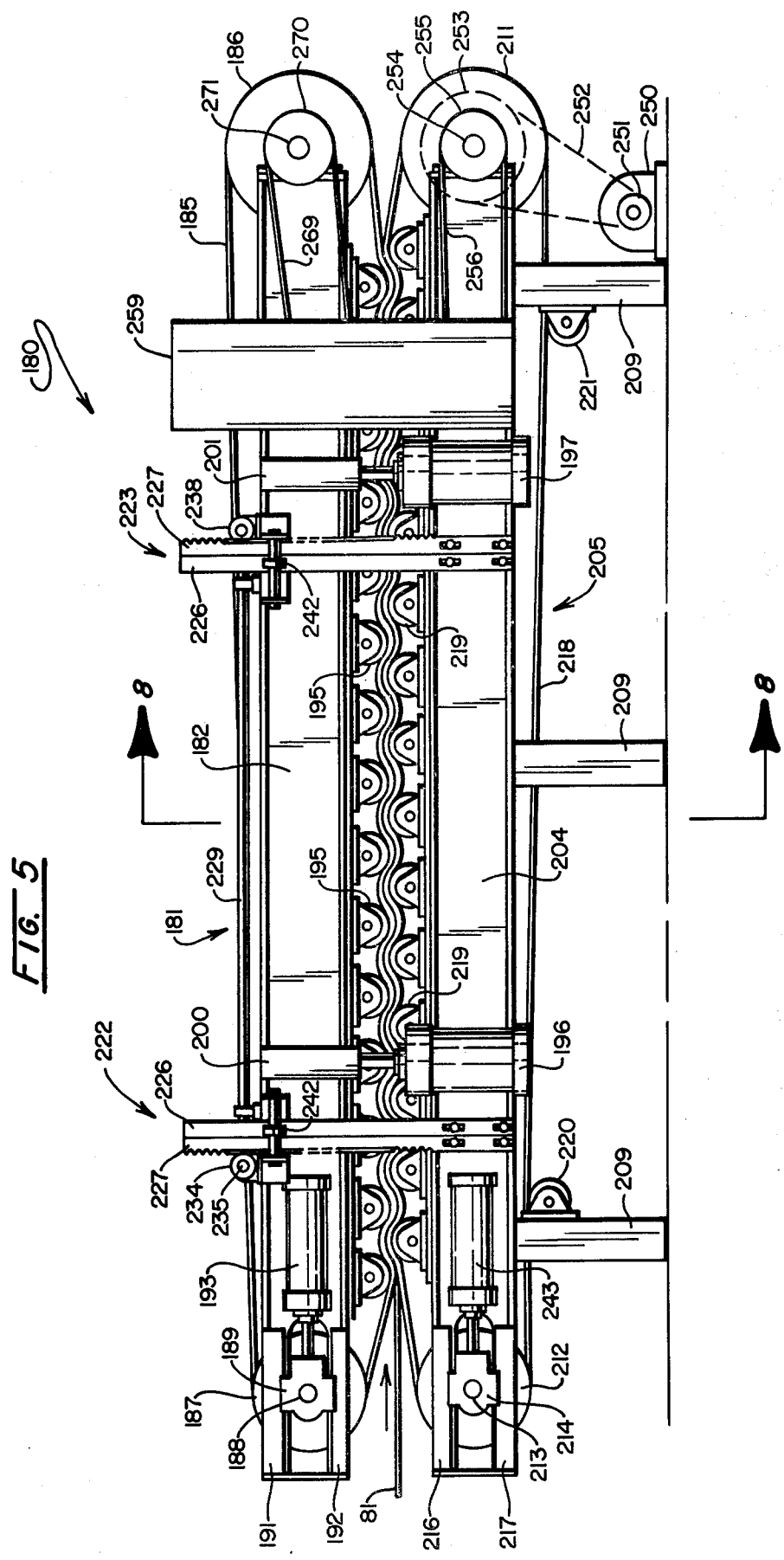
FIG. 5 is a side elevation view of another embodiment for apparatus serving to treat sheet molding compound.
Figure 6:
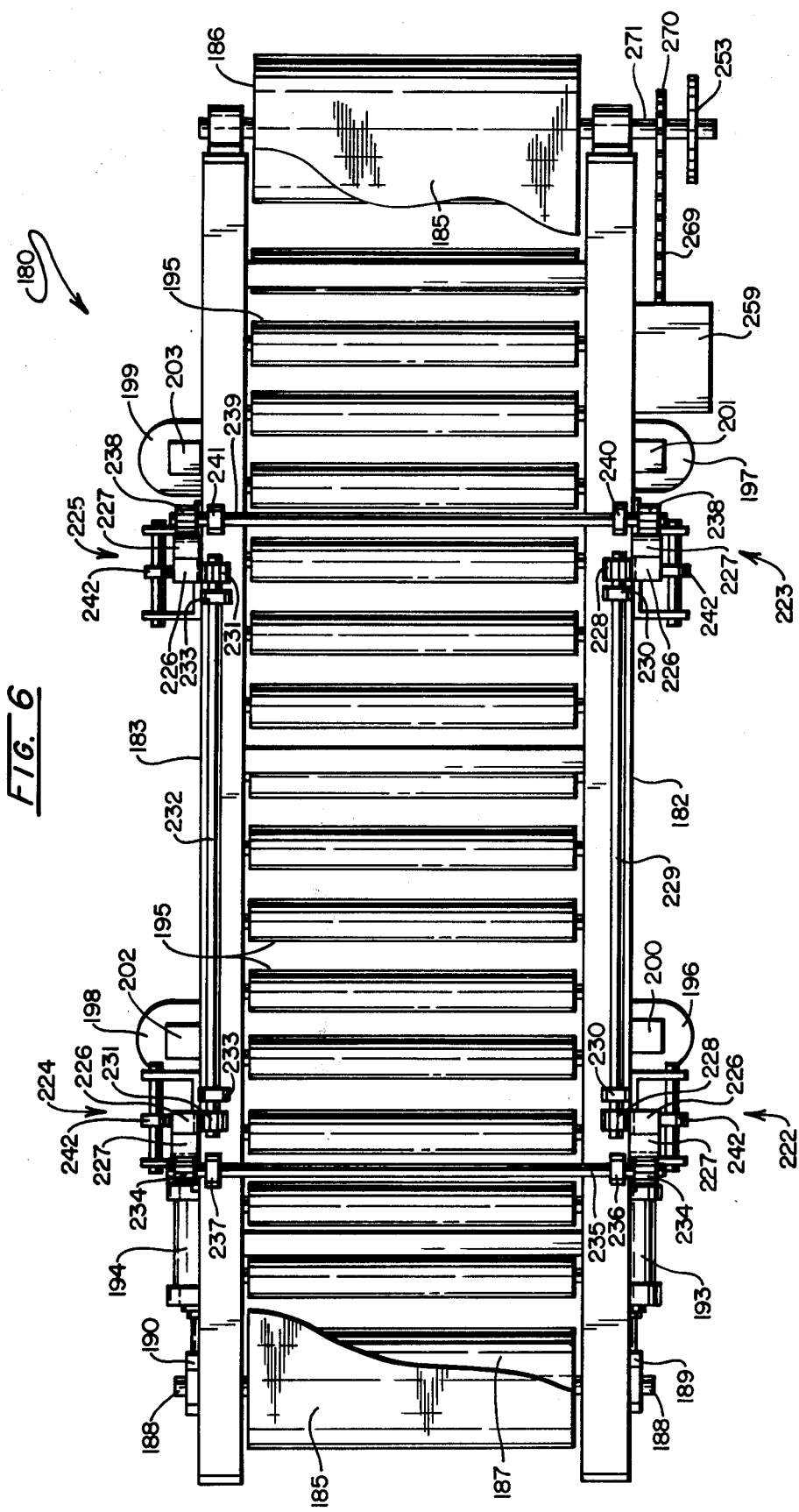
FIG. 6 is a top view of the apparatus of FIG. 5.
Figure 7:
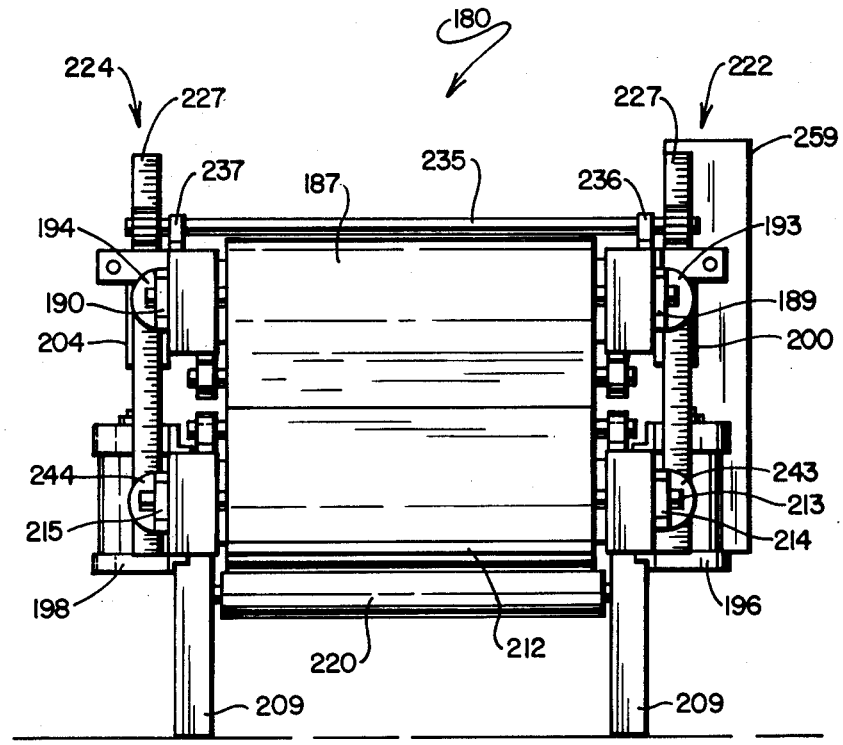
FIG. 7 is an upstream end view of the apparatus of FIG. 5.
Figure 8:
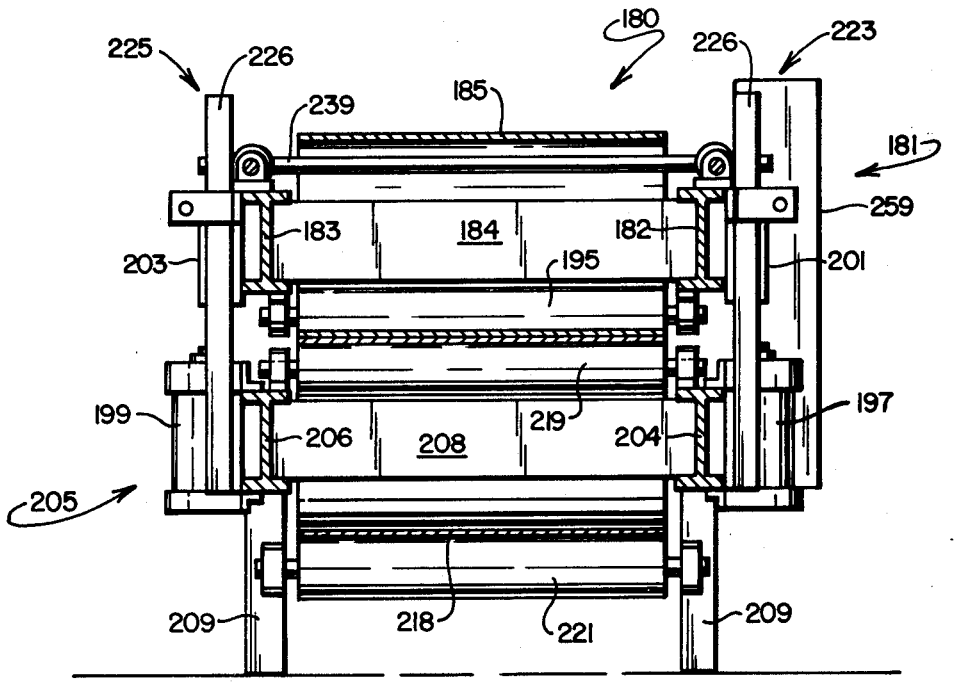
FIG. 8 is a partial sectional view of the apparatus of FIG. 5 taken in a downstream direction through the plane 8—8 in that figure.

Looking to FIGS. 5 and 6, as in the embodiment 100, the wet out stage 180 includes an upper member or carriage assembly 181 formed generally having side beams or supports 182 and 183 which, as revealed in FIG. 8, are retained in spaced apart relationship by cross beams, one of which is revealed at 184. As in the earlier embodiment, assembly 181 supports a continuous belt 185 which, preferably, is present as a metal mesh or weave belt capable of being driven in tension. Belt 185 extends about a drive roll 186, the surface of which is formed having a flexible or rubberized material assuring a positive drive contact with the underside of belt 185. At the forward or production upstream end of carriage assembly 181 there is positioned a freely rotating end roll 187 over which belt 185 is passed. Roll 187 serves to maintain belt 185 in a tension predetermined by the operator by virtue of the journalled connection of its axle 188 within opposed slideable supports 189 and 190. As shown in FIG. 5, each support as at 189 is mounted for horizontal manipulation by slideable engagement with two horizontally disposed beams 191 and 192. Supports 189 and 190, respectively, are maneuvered horizontally in consequence of their engagement with the movable piston of hydraulic cylinder assemblies 193 and 194. As in the earlier embodiments, assembly 181 also supports a plurality of spaced, rotatable, serially disposed rollers, certain of which are identified, for example at 195. The supports for these rollers 195 are coupled to the bottom flanges of oppositely disposed side beams 182 and 183.

Shown in its lowered operational orientation, the carriage assembly 181 is selectively moveable vertically, for example, to an orientation earlier described in connection with FIG. 3, by four pneumatic cylinders 196–199. The upwardly disposed ends of the piston rods extending from pneumatic cylinders 196–199 are each joined to a connector block as shown respectively at 200–203, each of which is fixed to an associated side beam 182 or 183. Serving as compression actuators, pneumatic cylinders 196–199 may be utilized to adjust the vertical position of carriage assembly 181 and the consequent compressive stress or compaction of the composite passing through the wet out stage 180.

Cylinders 196 and 197 are connected to the side beam 204 of a lower assembly represented generally at 205. As shown in FIG. 8, the corresponding side beam 206 serves to support the oppositely disposed pneumatic cylinders 198 and 199. That figure also reveals the presence of one cross beam 208 of an arrangement thereof serving to provide the support of and lateral spacing of beams 204 and 206. The entire stage 180 is supported above floor level by leg members 209 and 210 connected, respectively, to side beams 204 and 206 (see additionally FIGS. 7 and 8).

Formed in substantially similar fashion as carriage assembly 180, lower assembly 205 incorporates a drive roll 211 mounted for rotation at the downstream end thereof, as well as an end roll 212 at the upstream end thereof. The axle 213 of roll 212 is journaled for rotation within slideable supports 214 and 215 (see FIGS. 5 and 7). Supports 214 and 215, in turn, are mounted upon respective beams 204 and 206 by slideable connection with horizontally disposed guide beams, two of which are revealed at 216 and 217 in FIG. 5 as associated with support 213. Adjustment of the horizontal position of roll 212 is provided by pneumatic cylinder 243 and 244 in similar fashion as provided for end roll 187. Similar to the arrangement of end roll 187 of carriage assembly 181, end roll 212 serves to impart a predetermined tension upon a continuous belt 218 passing additionally over drive roll 211 and a plurality of spaced, rotatable, serially disposed rollers certain of which are identified at 219. Rollers 219 are supported across the upward flanges of side beams 204 and 206. Additional support for belt 218 is provided along the underside of assembly 205 by supplementary support rolls 220 and 221 which span across respective leg members 209 and 210 as shown. As in the case of the embodiment of FIGS. 3 and 4, rollers 219 are spaced with respect to rollers 195 of upper carriage assembly 181 such that the points of tangency of rollers 195 with the upwardly disposed surface of belt 185 fall intermediate the corresponding points of tangency of rollers 219 with the downwardly disposed surface of belt 218.

Looking additionally to FIGS. 5 and 6, upper carriage assembly 181 is provided having a leveling system constituted by four leveling assemblies shown generally at 222-225. Each of the latter assemblies is formed having a pair of adjacently disposed upstanding racks 226 and 227. The racks 226 and 227 of assemblies 222 and 223 are adjustably bolted to side beams 204, while the corresponding racks 226 and 227 of assemblies 224 and 225 are adjustably bolted to side beam 206. Racks 226 each face inwardly toward the center line of the assemblage, while corresponding racks 227 face outwardly in alignment with the lengthwise orientation of upper carriage assembly 181. The inwardly facing racks 226 of assemblies 222 and 223 are associated by corresponding pinions 228 which are enmeshed therewith and are fixedly journaled over the opposite ends of an elongate rod 229. Rod 229, in turn, is rotatably mounted between two spaced bearing assemblies 230, each of which is connected to the upwardly disposed portion of side beam 182. In identical fashion, as shown in FIG. 6, spaced pinions 231 are associated with racks 226 of assemblies 224 and 225. Pinions 231 are fixedly journaled to an elongate rod 232 which, in turn, is rotatably mounted upon beam 183 by spaced bearing assemblies 233. With the arrangement thus far described, upper carriage assembly 181 is restrained from tilting away from a horizontal orientation along the lengthwise extent of stage 180.

Leveling control in a direction transverse to the noted lengthwise extent is provided by a similar association of pinions 234 as enmeshed with corresponding racks 227 of spaced assemblies 224 and 222 at the upstream end of assembly 180. Pinions 234 are fixedly journaled to the ends of an elongate rod 235 which, in turn, is supported for rotation by spaced bearing assemblies 236 and 237 which are fixed, respectively, to the upper flanges of beams 182 and 183 (see FIG. 7). Similarly, toward the downstream end of stage 180, pinions 237 are enmeshed with corresponding racks 227 of spaced assemblies 223 and 225. Pinions 238 are fixedly journaled to the oppositely disposed ends of elongate rod 239 which is rotatably supported by spaced bearing assemblies 240 and 241. Assemblies 240 and 241 are fixed to the upwardly disposed flanges of respective side beams 182 and 183. Each of the leveling assemblies 222-225 also incorporates a retainer arrangement including a freely rotatable roller 242 which rides against the smooth outwardly disposed surface of a corresponding rack 226. With the arrangement thus described, upper carriage assembly 181 is retained in a horizontal orientation while being permitted vertical adjustment between open and closed orientations.

The wet out stage embodiment of FIGS. 5-8 particularly is characterized by the technique of treatment of the composite 81 as it progresses from the upstream through the downstream end of the apparatus. This direction is indicated in FIG. 5 by an arrow above a schematic representation of composite 81. In addition to the extended and continuous compression as well as the vertical undulation of the material, a third shear inducing factor is produced from the drive system itself. Initial drive for the system is provided by a motor 250 which delivers a rotative output through a sprocket 251. Looking additionally to FIG. 9, sprocket 251 is seen coupled through chain 252 in driving relationship with a sprocket 253. Sprocket 253, in turn, is journaled over and fixed to the axle 254 associated in driving relationship with drive roll 211 of lower assembly 205. Accordingly, drive roll 211 is rotated from the above described linkage. Note however, that a second sprocket 255 also is journaled and fixed to axle 254. This sprocket communicates via chain 256 to a sprocket 257 rotatable about axle 258 and positioned within a drive system housing 259. Sprocket 257 imparts rotational drive to a coaxially mounted sprocket 260. Sprocket 260, in turn, imparts drive to a chain 261 which extends upwardly and is driveably enmeshed with the teeth of a sprocket 262. From this engagement with sprocket 262, chain 261 extends about guide sprocket 263 which is rotatable about axle 264. From guide sprocket 263, chain 261 extends over an idler sprocket 265, freely rotatable about axle 266. From idler sprocket 265 chain 261 returns to engagement with sprocket 260. Axle 266 is mounted so as to be pivotally moveable about an arc and is biased in an upward direction by a conventional spring arrangement (not shown).

Sprocket 262 is eccentrically mounted upon an axle 267 and imparts drive thereto. Axle 267, in turn, is driveably connected to the center of a sprocket 268 and the latter sprocket imparts drive through a chain 269 to a drive sprocket 270. Sprocket 270, in turn, is journaled over and fixed to axle 271 and through that axle imparts drive to drive roll 186 of upper carriage assembly 181. It will be apparent that double sprockets may be utilized in combining sprockets 253 and 255 sprockets 257 and 260 and sprockets 262 and 268, depending upon the desires of the apparatus designer.

Figure 10:
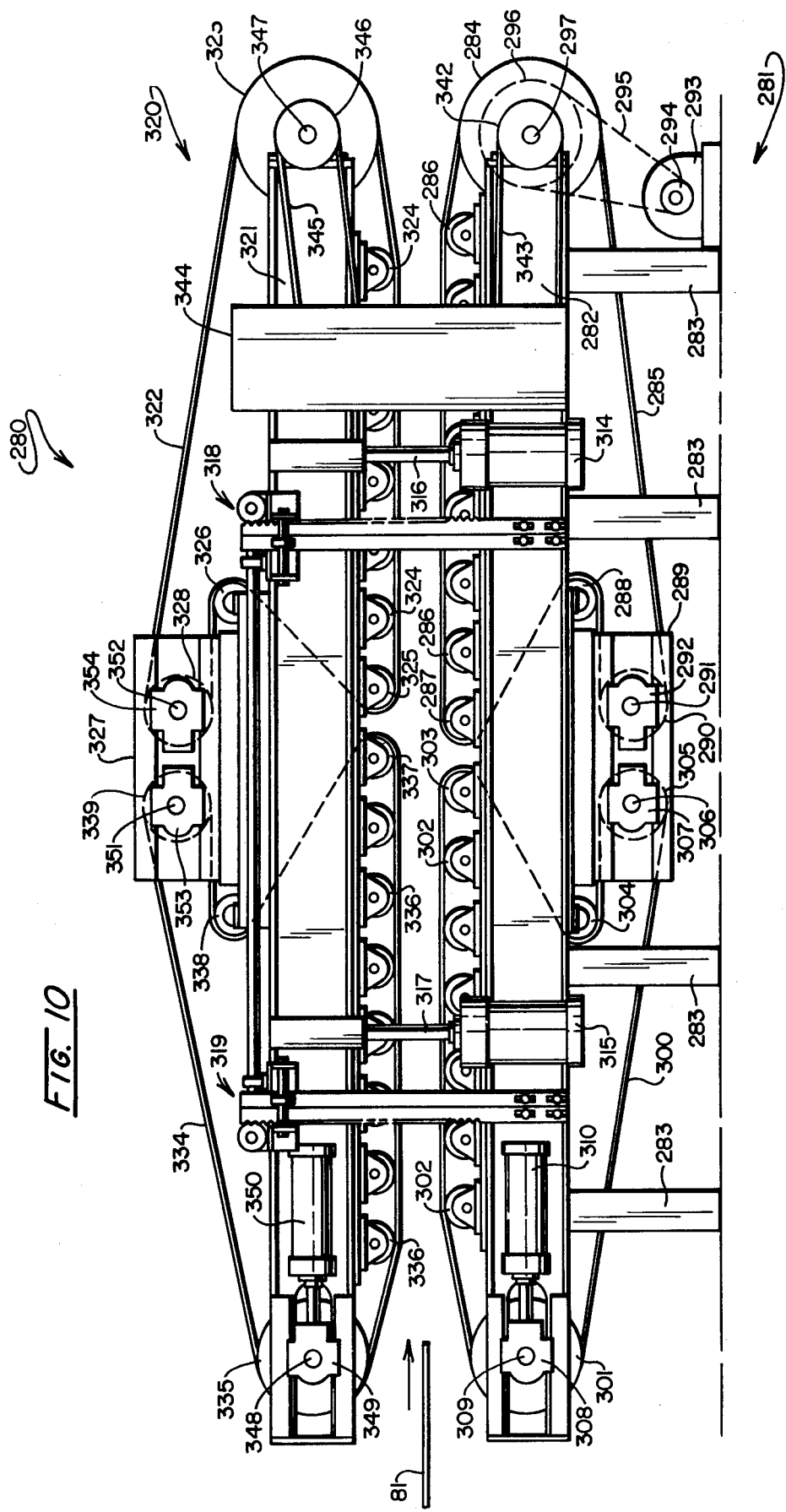
FIG. 10 is a side elevation view of still another embodiment for apparatus serving to treat sheet molding compound.

With the drive system thus described, it may be observed that the drive imparted through sprocket 253 to drive roll 211 of the lower assembly 281 is at a uniform fixed rate. However, the eccentric mounting of sprocket 262 imparts a drive through sprockets 268 and 270 to drive roll 186 of upper or carriage assembly 181 at a rate which continually oscillates a predetermined amount above and below the fixed rate of drive imparted to lower assembly drive roll 211. As a consequence, a further oscillatory shear action is imparted through the top of composite 81. This activity has been observed to enhance the wet out of the composite 81 and permit the fabrication of thicker composite as well as composites having higher fiber loadings. The biased arcuate movement of idler sprocket 265 may be observed to perform the necessary function of taking up slack within chain 261 in the course of the eccentric rotation of sprocket 262. An exemplary altered orientation of sprocket 265 is represented in FIG. 10 at 265', while the corresponding alteration of the orientation of chain 261 is represented in dashed line fashion at 261'. Note, that with the embodiment as described, composite 81 is subjected to a continuous compression coupled with a vertical undulation as well as a lengthwise induced shear due to the oscillatory drive emanating from drive roll 186. Note further, that the average rate of movement of chain 185 is equal to the fixed rate of movement of lower chain 218. As a consequence, the integrity of composite 181 is maintained throughout its passage along wet out stage 180.

Referring to FIG. 10, another embodiment for a wet out stage is revealed generally at 280. As before, composite 81 is fabricated as described in connection with FIGS. 1 and 2 prior to introduction at the upstream end of stage 280. This end is located at the production flow directional arrow positioned above the schematic representation of composite 81 in the figure.

As is apparent from the figure, the instant embodiment incorporates components somewhat similar to or identical to the embodiment described above in connection with FIGS. 5-9. In this regard, note that the stage 280 includes a lower assembly 281 having spaced elongate and parallel side beams, one of which is revealed at 282. The assembly is supported above floor level by leg members as at 283 and includes a drive roll 284 at the downstream terminus thereof. This drive roll preferably is provided having a surface texture suited for frictionally engaging a continuous belt 285. Such texture may be provided through the utilization of rubberized coatings or the like. As in the earlier embodiments, belt 285 has a width at least coextensive with composite 81 and the upwardly disposed portion thereof is situated such that its downwardly disposed surface extends over a plurality of spaced, freely rotatable, serially disposed smooth surface rollers, certain of which are identified at 286. Rollers 286 extend across the assembly 281 in the same fashion as in the embodiment of FIG. 6, however, roller 287 of the grouping positioned farthest upstream in the production path is located at about the midpoint of lower assembly 281. Upon passing over roller 287, belt 285 extends angularly downstream to pass over an idler roll 288 arranged in parallel with rollers 286 and 287 but, attached to the lowermost flange of the side beam of assembly 281. Upon passing over roll 288, belt 285 is introduced to one side of an equalizer assembly 289. Within assembly 289, belt 285 extends over a roll 290 having an axle 291 journaled for rotation within spaced slideable supports, one of which is revealed at 292. From roll 290, belt 285 extends in continuous fashion to drive roll 284. As in the earlier embodiments, drive to the assemblage is provided from a motor 293 having a rotative output at sprocket 294 which is imparted through chain 295 to sprocket 296 which is coupled in driving relationship with roll 284 through axle 297.

Positioned within lower assembly 281 upstream of belt 285 is another continuous belt 300. Belt 300 extends over an end roll 301 and thence in a downstream direction over a plurality of spaced, rotatable, serially disposed rollers, certain of which are identified at 302 and which are mounted upon the upper flange of the side beams of lower assembly 201. It may be noted that belt 300 is supported by rolls 302 at an elevation coplanar with the corresponding upwardly disposed portion of downstream belt 285. Upon passing the downstream roller 303 at about the midpoint of assembly 281, belt 300 is directed angularly upstream to an idler roll 304 attached to the lower flanges of the side beams as at 282 of assembly 281. From idler pulley 304, belt 300 is directed into equalizer assembly 289, whereupon it passes over a drive-type roll 305 supported upon transverse axis 306. Axle 306 is journaled for rotation within slideable supports, one of which is revealed at 307. Tension is imparted to belt 300 through end roll 301 by a pneumatic arrangement identical to the embodiment of FIG. 5, that arrangement including slideable supports, one of which is revealed at 308 through which the axle 309 is journaled for rotation and which is actuated for horizontal manipulation to adjust tensioning by pneumatic cylinder 310.

Equalizer assembly 289 is conventional in the art and provides a dual operation function. First, the assembly transfers synchronous rotative drive from driven belt 285 through roll 290 and to roll 305. Roll 305 then serves as the drive for continuous belt 300. Additionally, through providing a co-action between slideable supports as at 307 and 292, the tensioning adjustment provided from pneumatic cylinder 310 additionally is asserted into continuous belt 285.

The upper carriage assembly of stage 280 is represented generally at 320 in an orientation wherein it is elevated for purposes of servicing or set up. The assembly is formed similarly to the corresponding assembly of the embodiment of FIG. 5, including a rectangular frame incorporating side beams, one of which is revealed at 321. Elevating carriage assembly 320 is carried out in a manner identical to that described in connection with FIGS. 5-9, including pneumatic cylinders such as those depicted at 314 and 315. Note that the respective piston rods 316 and 317 of the cylinders are extended to elevate the upper assembly to the orientation shown. Stage 280 also includes a leveling arrangement identical to the embodiment of FIGS. 5-9, two of the four assemblies being revealed in general at 318 and 319.

The assembly is structured having two discrete continuous belts, the downstream belt 322 extending around drive roll 323. As before, the surface of roll 323 is textured with rubberized material or the like so as to provide adequate frictional driving engagement with belt 322. Upon passing roll 323, belt 322 extends beneath a plurality of spaced, rotatable, serially disposed, smoothly surfaced rollers, certain of which are represented at 324 and the furthest upstream of which is represented at 325. From generally centrally located roller 325, belt 322 extends angularly downstream to pass over an idler roller 326 attached to the top flange of the side beams as at 321. From idler 326 belt 322 is introduced into an equalizer assembly 327 within which is passed over roll 328 and returns above carriage assembly 320 for engagement with drive roll 323.

The upstream continuous belt of carriage assembly 320 is represented at 334 and is depicted passing over end roll 335, whereupon it is directed in a downstream direction beneath a plurality of spaced, rotatable, serially disposed, smoothly surfaced rollers, certain of which are revealed at 236. At about the center of the assembly 320, belt 334 is passed over downstream roll 337 and directed angularly in an upstream direction to pass over an idler roll 338. From idler roll 338, the belt is introduced to equalizer assembly 327 within which it is passed over roll 339.

Figure 9:
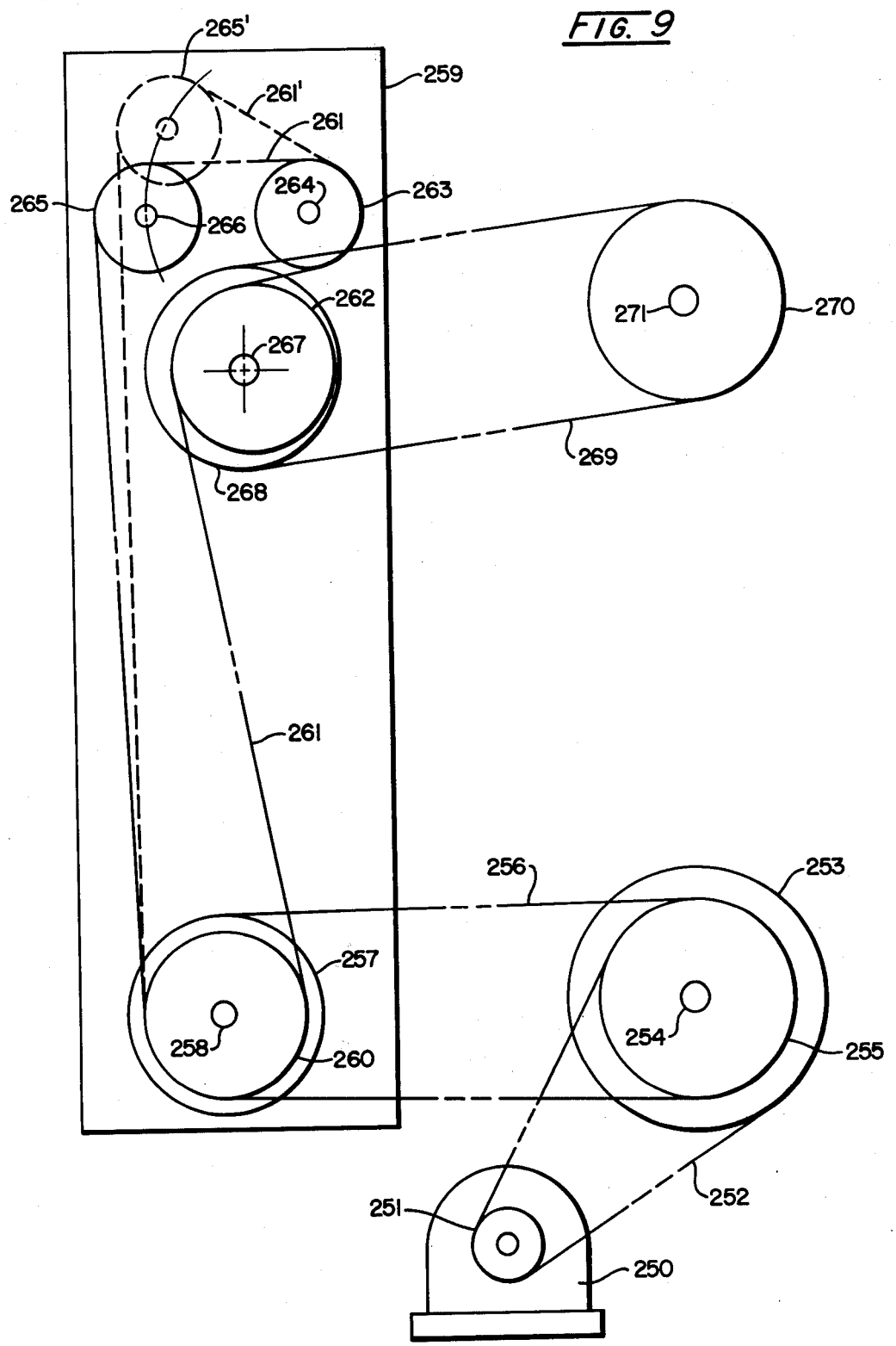
FIG. 9 is a schematic elevation view of the drive arrangement of the apparatus of FIGS 5 and 6.

Looking to the drive aspects of the dual belted assembly 320, an arrangement identical to that described in connection with FIG. 9 is provided. In this regard, a drive sprocket 342 is journaled over and fixed to axle 297 so as to be rotated therefrom. Sprocket 342 drives a chain 343 which introduces rotative drive to the sprockets contained within a drive system housing 344, the latter retaining components identical to those described in connection with FIG. 9. The output from housing 344 is provided at chain 345 which extends around sprocket 346 fixed, in turn, to the axle 347 coupled to drive roll 323. Chain 345 serves the same function as earlier-described chain 269 and provides a rotative drive at a rate which oscillates evenly above and below the fixed rate imparted to lower assemblage drive roll 284. The drive imparted to chain 322 is transferred through equalizer assembly 326 to upstream continuous belt 344 by virtue of the geared or chain driven association of role 339 with roll 328. Also similar to the embodiment described in connection with FIGS. 5-9, the axle 348 of end roll 335 is coupled through a pair of oppositely disposed slideable supports, one of which is revealed at 349. Supports as at 349 may be adjusted horizontally through their connection with the piston rod of a pneumatic cylinder as at 350. The tensioning derived through actuation of cylinder 350 is transferred from belt 334 to belt 322 through equalizer assembly 327. In this regard, note that the axles 351 and 352 of respective rolls 339 and 329 are rotatably journaled within slideable support members, two of which are revealed respectively at 353 and 354. Through interconnection of these support members, tension is transferred from roll 339 to roll 328.

To impart an appropriate vertically undulating motion to composite 81 as it passes through wetting stage 280, it may be noted that the points of tangency of rolls 336 with the upwardly disposed surface of belt 334 reside intermediate the points of tangency of rolls 302 with the lower disposed surface of belt 300. Similarly, the points of tangency of rolls 324 with the upwardly disposed surface of belt 322 lie intermediate the corresponding points of tangency of rolls 286 with the underside of belt 285. Accordingly, when pneumatic cylinders 314 and 315 and their counterparts on the opposite side of stage 280 are appropriately actuated to lower upper carriage assembly 320, composite 81 will be caused to flex in a vertically undulating fashion. As this form of shear activity is carried out under the effect of compression, a third effect is induced through the oscillation of the rate of travel of the upwardly disposed belts.

In addition to the above-noted three aspects of the physical treatment of the composite 81, it is apparent that the embodiment of FIG. 10 provides an enhanced latitude of material manipulation for the designer. For example, the apparatus can be arranged to provide a difference in the extent of compression for the upstream belts as opposed to the downstream belts. In many instances it may be desirable, for example, to provide a lesser degree of compression in the upstream belts as opposed to the downstream belts. Such an arrangement may serve to avoid the transverse migration of resinous matrix material through the sides of the thin supporting sheets within which it is sandwiched. This differential of compression also is available with the embodiment shown in FIGS. 5-9, sufficient latitude of tolerance being available in the leveling system of the upper carriage assembly of each of the embodiments.

As indicated above, the preferred type of continuous belt utilized with the apparatus of the invention is a weave or mesh belt. Such belts, for example as produced by Ashworth Bros., Inc., Winchester, Va., are available in a broad variety of weave configurations as well as in a variety of materials. For example, the belts are fabricated in a full range of ferrous, non-ferrous and nickel chrome alloys. Preferably, a steel mesh belt is utilized with the apparatus of the instant invention.

A particular aspect of belt usage is concerned with the embodiment of FIG. 10. Where thick composites as at 81 are prepared, a phenomenon wherein the resin matrix migrates transversely, as discussed above, may be encountered. This phenomenon sometimes is referred to as "squeeze out". It is necessary, therefore, to achieve some form of initial compression through the upstream pair of belts without developing the noted transverse resin migration. By selecting a coarser mesh weave for the continuous belts at 334 and 300, the resin becomes entrapped in pockets created within the openings of the mesh, those pockets being created by resin pressure upon the thin vinyl supporting sheets described earlier. As a consequence, the resin matrix in the starting material is trapped and cannot transversely migrate during initial compression. As the composite then moves from the upstream pair of belts, it encounters the downstream belts as at 322 and 285. After the initial treatment, these latter belts may be provided having a finer weave to achieve a final high quality wet out of the relatively thick composite 81.

The improvement achieved with the invention may be considered somewhat significant. For example, before the utilization of the instant wet out stages, production was limited to relatively thin composites of thickness of about one-fourth inch. Normally, this material would be produced at a speed of about 20 to 25 feet per minute and at a maximum weight of about 16 ounces per square foot. With the introduction of the device described in FIGS. 1 and 2, a fifty percent increase in the speed of production was recognized and composites having a twenty to twenty-five percent increase in weight per square foot were available with process. Further, with the development of the embodiments of FIGS. 3 and 4, materials weighing about 40 ounces per square foot could be produced at the higher speeds achieved with the embodiment of FIGS. 1 and 2, i.e. about 30 feet per minute.

Still another embodiment will readily occur to the art-skilled in connection with the instant invention. For example, the dual belt arrangement of upper carriage assembly 320 shown in FIG. 10 may be combined with a singular belt at the lower assemblage or vice-versa.

Having described the invention in detail and with reference to the drawings, it will be understood that such specifications are given for the sake of explanation. Various modifications and substitutions other than those cited can be made without departing from the scope of the invention as defined by the following claims.

What is claimed is:

1. A method of wetting out fibers in an indefinite length layer of resinous material, comprising:
   providing a first mesh surface movable along a predetermined path;
   providing a second mesh surface opposite said first surface movable along said path;
   compressing a layer containing resin and fibers between said first surface and said second surface along said path;
   moving said first surface along said path at a first rate; and,
   moving said second surface along said path at a second rate; said second rate continuously varying within a predetermined range of rates above and below said first rate.

2. The method of claim 1 wherein said first rate is fixed.

3. The method of claim 1 further comprising providing a third surface movable along said path adapted to compress said layer between said first surface and said third surface; and moving said third surface at a third rate; said third rate continuously varying within a range of rates above and below said first rate.

4. The method of claim 3 wherein said said second rate and said third rate are substantially equal.

5. The method of claims 3 or 4 wherein said second rate and said said third rate are synchronized.

6. The method of claims 1, 2, or 3 wherein said path is undulatory.

7. The method of claim 1 further comprising:
providing a third surface movable along said path; providing a fourth surface opposite said third surface movable along said path adapted to compress said layer between said third surface and said fourth surface; the layer being subject to a greater compressive force between the first surface and the second surface than between the third surface and the fourth surface.

8. The method of claim 7 wherein said fourth surface is moved at said first rate.

9. The method of claim 8 wherein said third surface is moved at a third rate; said third rate continuously varying within a predetermined range of rates above and below said first rate.

10. The method of claim 9 wherein said said second rate and said third rate are synchronized.

* * * * *